(12) United States Patent
Petropoulos et al.

(10) Patent No.: US 10,834,264 B1
(45) Date of Patent: Nov. 10, 2020

(54) SYSTEMS AND METHODS FOR SIMULATING MULTIPLE CALL CENTER BALANCING

(71) Applicant: United Services Automobile Association (USAA), San Antonio, TX (US)

(72) Inventors: Lambros Petropoulos, San Antonio, TX (US); Bipin Chadha, San Antonio, TX (US); Michael P. Gout, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/426,874

(22) Filed: Feb. 7, 2017

Related U.S. Application Data

(63) Continuation of application No. 15/066,132, filed on Mar. 10, 2016, now Pat. No. 10,498,897.

(60) Provisional application No. 62/140,748, filed on Mar. 31, 2015, provisional application No. 62/292,979, filed on Feb. 9, 2016.

(51) Int. Cl.
| | |
|---|---|
| *H04M 3/00* | (2006.01) |
| *H04M 5/00* | (2006.01) |
| *H04M 3/523* | (2006.01) |
| *H04M 3/42* | (2006.01) |
| *G10L 25/63* | (2013.01) |
| *H04M 7/00* | (2006.01) |
| *H04L 12/66* | (2006.01) |

(52) U.S. Cl.
CPC .......... *H04M 3/5237* (2013.01); *G10L 25/63* (2013.01); *H04M 3/42059* (2013.01); *H04M 3/5232* (2013.01); *H04M 3/5238* (2013.01); *H04M 2203/551* (2013.01)

(58) Field of Classification Search
CPC ............ H04M 3/5183; H04M 3/5238; H04M 2207/12; H04M 3/42161; H04M 3/42323; H04M 3/523; H04M 3/5231; H04M 3/5232; H04M 3/5235; H04M 3/5191; H04M 3/5237; H04M 1/72569; H04M 1/72572; H04M 3/5233; H04L 41/026; H04L 41/22; H04Q 3/62; G06Q 30/02; G06Q 30/0201; G06Q 30/0207; G06Q 30/0255; G06Q 30/0269; G06Q 30/0211; G06Q 30/0224
USPC ............ 379/265.13, 266.01, 203.01, 265.01, 379/265.09, 88.01; 705/14.53, 26.1, 38, 705/4, 14.1, 14.66, 14.25, 14.55; 370/412, 352
See application file for complete search history.

(56) References Cited

U.S. PATENT DOCUMENTS

| | | |
|---|---|---|
| 5,590,188 A | 12/1996 | Crockett |
| 6,553,113 B1 | 4/2003 | Dhir et al. |
| 7,313,613 B1 * | 12/2007 | Brooking ............ H04L 41/0631 709/220 |
| 7,536,002 B1 | 5/2009 | Ma et al. |
| 7,593,904 B1 * | 9/2009 | Kirshenbaum ...... G06N 99/005 706/12 |

(Continued)

*Primary Examiner* — Ahmad F. Matar
*Assistant Examiner* — Kharye Pope
(74) *Attorney, Agent, or Firm* — BakerHostetler (57) ABSTRACT

Systems and methods balance loads of traffic directed to various response entities. Systems and methods alternatively or complementarily generate simulated loads of traffic for handling by various response entities or load balancing algorithms.

18 Claims, 6 Drawing Sheets

(56) References Cited

U.S. PATENT DOCUMENTS

| | | | |
|---|---|---|---|
| 8,289,845 B1* | 10/2012 | Baldonado | H04L 43/50 370/229 |
| 8,306,908 B1 | 11/2012 | Barker et al. | |
| 8,787,552 B1* | 7/2014 | Zhao | H04M 3/5175 379/265.05 |
| 8,825,513 B1 | 9/2014 | Misra et al. | |
| 10,096,068 B1 | 10/2018 | Ross et al. | |
| 2003/0200135 A1 | 10/2003 | Wright | |
| 2004/0062380 A1* | 4/2004 | Delaney | H04M 3/5237 379/265.02 |
| 2004/0193475 A1 | 9/2004 | Hemm et al. | |
| 2005/0129217 A1 | 6/2005 | McPartlan et al. | |
| 2006/0072737 A1 | 4/2006 | Paden et al. | |
| 2006/0227961 A1 | 10/2006 | Lai et al. | |
| 2007/0036329 A1* | 2/2007 | Joseph | H04M 3/5183 379/265.01 |
| 2008/0095355 A1 | 4/2008 | Mahalaha | |
| 2008/0288339 A1* | 11/2008 | Streeter | G06Q 30/02 705/14.13 |
| 2009/0157449 A1 | 6/2009 | Itani et al. | |
| 2009/0171668 A1 | 7/2009 | Sneyders et al. | |
| 2009/0180607 A1 | 7/2009 | Kamlet | |
| 2009/0190740 A1* | 7/2009 | Chishti | H04M 3/5233 379/265.06 |
| 2009/0190744 A1* | 7/2009 | Xie | H04M 3/5232 379/265.11 |
| 2009/0248418 A1 | 10/2009 | Jaiswal | |
| 2010/0017263 A1 | 1/2010 | Zernik et al. | |
| 2010/0020959 A1* | 1/2010 | Spottiswoode | H04M 3/5232 379/265.1 |
| 2010/0082839 A1 | 4/2010 | Brunson et al. | |
| 2010/0169147 A1 | 7/2010 | McCormack | |
| 2011/0069821 A1 | 3/2011 | Korolev | |
| 2011/0270771 A1* | 11/2011 | Coursimault | G06Q 10/06 705/304 |
| 2011/0313900 A1 | 12/2011 | Falkenborg et al. | |
| 2012/0148040 A1* | 6/2012 | Desai | H04M 3/493 379/265.13 |
| 2012/0173243 A1* | 7/2012 | Anand | H04M 3/4936 704/270.1 |
| 2013/0223613 A1 | 8/2013 | Birk et al. | |
| 2013/0251137 A1* | 9/2013 | Chishti | H04M 3/5232 379/265.11 |
| 2013/0282430 A1 | 10/2013 | Kannan et al. | |
| 2014/0006861 A1* | 1/2014 | Jain | G06Q 30/01 714/26 |
| 2014/0023186 A1 | 1/2014 | Srinivas | |
| 2014/0067503 A1 | 3/2014 | Ebarle Grecsek et al. | |
| 2014/0115176 A1 | 4/2014 | Kamboth | |
| 2014/0140494 A1* | 5/2014 | Zhakov | H04M 3/5175 379/265.03 |
| 2014/0146960 A1 | 5/2014 | Williams | |
| 2014/0172627 A1 | 6/2014 | Levy et al. | |
| 2014/0207494 A1 | 7/2014 | Rowell | |
| 2014/0355748 A1* | 12/2014 | Conway | H04M 3/523 379/265.1 |
| 2015/0032508 A1 | 1/2015 | Lotlikar | |
| 2015/0215463 A1 | 7/2015 | Shaffer et al. | |
| 2015/0215464 A1* | 7/2015 | Shaffer | H04M 3/5238 379/266.06 |
| 2015/0347951 A1* | 12/2015 | Tamblyn | G06Q 30/0631 705/7.39 |
| 2016/0005070 A1 | 1/2016 | Burr et al. | |
| 2016/0057284 A1 | 2/2016 | Nagpal et al. | |
| 2016/0078544 A1* | 3/2016 | Brady | G06Q 40/08 705/4 |
| 2016/0117628 A1* | 4/2016 | Brophy | G06Q 10/063112 704/2 |
| 2016/0150087 A1* | 5/2016 | Nowak | H04M 3/5238 379/265.1 |
| 2016/0283888 A1* | 9/2016 | Laing | G06Q 30/02 |
| 2017/0155764 A1* | 6/2017 | Zampiello | H04M 3/5116 |

* cited by examiner

SYSTEMS AND METHODS FOR SIMULATING MULTIPLE CALL CENTER BALANCING

CROSS-REFERENCE TO RELATED APPLICATIONS

This application is a continuation of U.S. Ser. No. 15/066,132, filed on Mar. 10, 2016, which claims priority to and the benefit of U.S. Provisional Patent Application Ser. No. 62/140,748, filed Mar. 31, 2015. This application also claims priority to and the benefit of U.S. Provisional Patent Application Ser. No. 62/292,949, filed Feb. 9, 2016. All of these documents are incorporated herein by reference in their entirety.

TECHNICAL FIELD

The present disclosure generally relates to load balancing and, more specifically, to anticipating the effects of changing load balance parameters on multiple call centers.

BACKGROUND

Effective load balancing algorithms are essential to distributing call volumes fairly across multiple call centers without negatively impacting performance of one or more of the multiple call centers. Due to the coupled nature of call centers in a multiple-call-center arrangement, load-balancing algorithms are more effectively tested across all call centers in the arrangement, rather than testing at one call center at a time. Thus, testing and modifying load balancing generally affects customers and customer service representatives. There is a need for an environment or simulation of interrelated multiple call centers in which different load balancing algorithms can be tested and modified without disrupting customer service operations at the call centers.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

In an embodiment, a method includes receiving a call from a caller for routing to a call center, generating an upsell propensity value based on caller account information and group history for correlated customer groups with which the caller is associated, generating an urgency value based on caller attitude information, generating a complexity value based on call issue information, generating a call score based on the upsell propensity, urgency value, and complexity value, matching one or more call centers to the call score, analyzing the one or more call centers to determine a minimum expected delay, selecting a selected call center based on the call score and minimum expected delay, and routing the call to the selected call center.

In an embodiment, a system includes a processor operatively coupled with a non-transitory computer readable media, the non-transitory computer readable media storing instructions. When executed, the instructions can implement or otherwise utilize an inbound call manager module that receives an incoming call and a customer information module of the inbound call manager module. The customer information module receives caller account information and generates an account value based on the caller account information. Further included is an urgency module of the inbound call manager module. The urgency module develops caller attitude information and generates an urgency value based on the caller attitude information. Further included is a complexity module of the inbound call manager module, the complexity module determines call issue information and generates a complexity value based on the call issue information, as well as a load balancer module that receives information from the inbound call manager module. Further included is a call score module of the load balancer module which receives the account value, the urgency value, and the complexity value and generates a call score based on the account value, the urgency value, and the complexity value. Further included is a routing module of the load balancer module, the routing module routes the incoming call to a selected call response entity based on the call score.

In an embodiment, a system includes a processor operatively coupled with a non-transitory computer readable media, the non-transitory computer readable media storing instructions. When executed, the instructions can implement or otherwise utilize a call simulator module operatively coupled with a computer system running a load balancing algorithm and a call simulator analysis module that receives one or more response entity profiles. The response entity profiles are based on performance metrics associated with one or more response entities to which the load balancing algorithm routes inbound calls. Further included is a call simulator generation module which generates a simulated load of simulated calls having varying call characteristics. The varying call characteristics are based on the response entity profiles. Further included is a call simulator routing module which transmits the simulated load to the computer system.

BRIEF DESCRIPTION OF THE DRAWINGS

The accompanying drawings and/or appendices illustrate various non-limiting examples and inventive aspects in accordance with the present disclosure.

DETAILED DESCRIPTION

Balancing incoming calls to an arrangement of multiple calling centers may depend upon numerous, dynamic factors, including the routing protocols of the calling centers, skill levels of customer service agents ("agents") at the call centers, the number of agents at each call center, call complexity, forecasted and actual call volumes, wait times, call abandonments, customer characteristics, and the like. This multifactor load-balancing methodology may be refined and tweaked through experimentation or trial-and-error. That is, testing new load balancing settings or measures may benefit from seeing these changes applied in practice. The disclosed systems and methods provide a simulation of a multi-call center system in which new load balance settings or measures may be applied and evaluated prior to launching such measures in practice.

Figure 1:
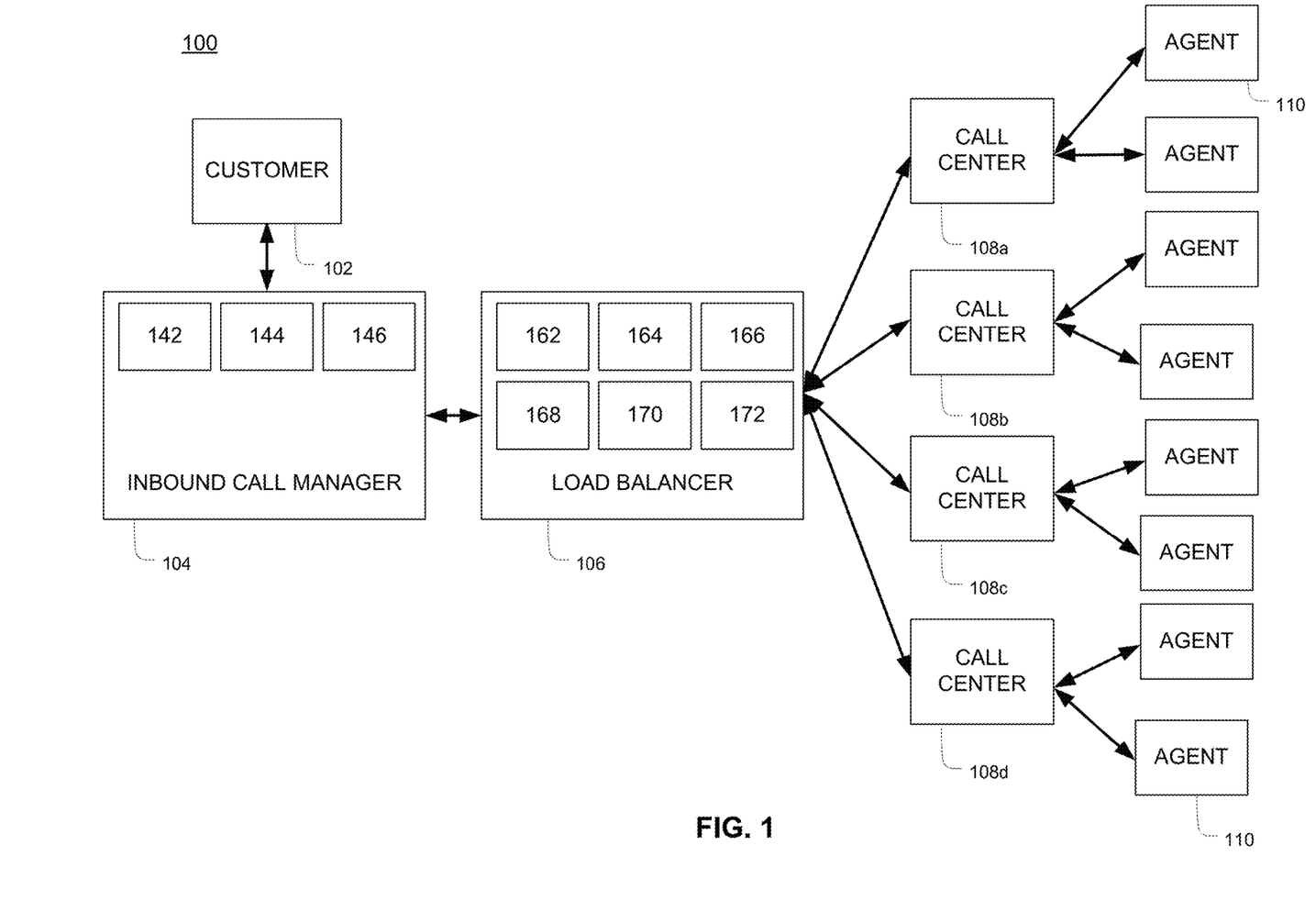
FIG. 1 is a block diagram of an exemplary arrangement of multiple call centers.

Now referring to the drawings, wherein like reference numbers refer to like elements, there is illustrated an exemplary environment 100 that may be simulated using the disclosed technology, in accordance with an aspect of the disclosure. As shown in FIG. 1, for example, environment 100 may represent a data flow as part of providing customer service to a customer 102. Customer 102 may call or otherwise initiate communication with a service provider. The communication may be routed to an inbound call manager module 104.

From customer 102, inbound call manager module 104 may obtain information related to customer 102 or the desired service. For example, inbound call manager module 104 may comprise an automated system that requests information from customer 102. In an aspect, inbound call manager module 104 may comprise an interactive voice response (IVR) solution that uses prerecorded prompts and menus to present information or options to customer 102. In response, customer 102 may provide account information, such as identification information (e.g., name, account number, address, telephone number), or information related to the service requested (e.g., identifying a service type, whether the call is related to a previous service request) to inbound call manager module 104. Customer 102 may provide this information in any number of ways, such as through voice inputs (with voice-to-text translation) or keypad inputs. Inbound call manager module 104 may analyze the account information. For example, inbound call manager module 104 may score or categorize the call from customer 102 based on at least the input information. Inbound call manager module 104 may optionally consider other factors to score or categorize the call from customer 102, such as, for example, a customer or service history of customer 102, related customers or shared accounts (e.g., family members, businesses), or other information.

Inbound call manager module 104 may provide the input information received from customer 102, an analysis of the input information, the score or category associated with the call, or any other information to a load balancer module 106. In turn, load balancer module 106 may decide, based on the data received from inbound call manager module 104, how to route the call from customer 102. This may include identifying a particular call center 108. Optionally, the routing may include identifying a particular agent 110 to which the call may be routed.

Load balancer module 106 may obtain or monitor information relating to call centers 108 or agents 110. For example, this information may include, but not be limited to, call-answer statistics (e.g., the number of calls answered within a certain amount of time, the number of calls dropped before being answered), call statistics (e.g., average call time, time to resolve calls, number of calls from a particular customer 102 until his/her issue is resolved), the routing protocol (e.g., Avaya, CISCO routing), agent skill level, headcount of agents at a given call center 108, expected delays associated with one or more call centers 108 or agents 110, forecasted call volumes (e.g., by call type, for a time period), or any other statistics or data associated with one or more call centers 108 or agents 110.

Load balancer module 106 may engage in rules-based decision making based on the information related to call centers 108, agents 110, or customer 102. These rules may dynamically change. For example, if a queue associated with call center 108a exceeds a threshold, load balancer module 106 may dynamically react to shift incoming calls that would otherwise be directed to call center 108a to another call center 108 (e.g., call center 108b). Load balancer module 106 may generally direct calls to a particular call center 108. Optionally, load balancer module 106 may provide additional information to call center 108 that can be used by call center 108 to identify a particular agent 110 to which the call will be routed. Optionally, load balancer module 106 may identify a particular agent 110, type of agent 110, or other aspect of agent 110 at call center 108 to which the call should be routed.

Incoming call from customer 102 may be scored or categorized by one or more of inbound call manager module 104 and load balancer module 106. In an aspect, a call may be scored or evaluated to determine or predict an upsell propensity ("propensity value"). A propensity value may be indicative of how likely customer 102 may be open or interested in discussing products, services, or the like other than the specific reason for customer's call. A propensity value may be assessed on a range (e.g., very likely to not likely at all) or as a binary value (e.g., an indication of whether to engage in upselling with customer 102). Optionally, a propensity value may indicate a type of upselling to be applied to customer 102. For example, a propensity value may indicate customer 102 is open to upselling for one category of services or products, but not another. For example, a propensity value may indicate customer 102 is highly likely to be interested in additional homeowner services but is uninterested (or less interested) in purchasing additional car products or services.

The propensity value may be based on a formula derived from previous sales/call data. For example, by evaluating these types of records, a correlation between customer's age range (e.g., 45-65) and an interest in additional services or products (e.g., retirement planning) may be identified. This information may affect or impact a customer's propensity value. For example, a customer's age may be derived from information acquired by inbound call manager module 104. The propensity value for customer 102 aged 56 may be higher than if their age was 32, at least for upselling pertaining to retirement planning. As another example, evaluation of past sales or calls may indicate a correlation between purchasing increased life insurance and certain major life events (e.g., marriage, home purchase, new child, job change). Inbound call manager module 104 may ask certain questions that may indicate the occurrence of such major life events, and the occurrence or nonoccurrence of such events may impact the propensity value.

The propensity value may optionally be based on the reason of the call. For example, if customer 102 is calling to fix a high priority (e.g., large dollar value) or emergency (e.g., time sensitive) issue, the propensity value may be lower based on that issue. As another example, analysis of past calls may identify a correlation between customers calling regarding a first type of service and a high upselling rate for a second type of service. For example, customer 102 may be more likely to be interested in increasing a liability coverage amount for a car insurance policy when calling to add another driver or car to the insurance policy. Such information may be factored into his/her propensity value.

An urgency value can also be used in routing of calls. The urgency value may optionally be based on the behavior of customer 102. For example, voice analysis of customer's responses to questions or prompts from inbound call manager module 104 may indicate a customer's character or mood (e.g., impatient, frustrated) that can be evaluated and correlated to an urgency value. Another customer behavior that may impact the urgency value is the speed at which customer 102 responds to prompts, the number of times customer 102 changes their answer, returns to a previous prompt, or requests a prompt be repeated, or the like. A correlation between the speed at which customer 102 completes the information-gathering process performed by inbound call manager module 104 may correlate to an urgency for being receptive to upselling. This and any other behavioral attributes of customer 102 may factor into the urgency value of customer 102.

The reason or reasons for customer 102 to make the call may be evaluated and further impact algorithms or processes of load balancer module 106. For example, inbound call manager module 104 or load balancer module 106 may evaluate the complexity or difficulty of an incoming call to produce a complexity value. This evaluation may consist of categorizing the call (e.g., as low, medium, or high), scoring a call (e.g., on a 10-point scale), or any other evaluation method. This evaluation may be based on the type of services requested by customer 102, such as based on information obtained by inbound call manager module 104. For example, the evaluation may be based on a category of services or products relating to the call (e.g., auto insurance, life insurance, household products), or the complexity of customer's request. For example, a call regarding a dishwasher warranty may be categorized as less complex than a call regarding a health insurance policy, or a call regarding adding a beneficiary to an investment fund may be categorized as less complex than a call regarding multiple movements of funds within the investment fund. This categorizing or ranking of the call may be independent of the propensity value, urgency value, or other attributes.

The categorizing or ranking of the call may depend upon a skill set with which agent 110 may respond to the call. For example, calls that require knowledge in a certain product or service may be categorized together. As another example, certain calls may be grouped together to be answered by a specific type of agent 110 or call center 108. For example, it may be desirable that, when balancing the multiple call centers, load balancer module 106 routes all calls regarding auto insurance claims to call center 108c. Additionally or alternatively, load balancer module 106 may operate such that all calls regarding life insurance policies not be routed to call center 108b.

Thus, the result of evaluating the call may include a category or ranking of the call, or conditions regarding the handling of the call. For example, the results may include one or more of a call type, a subject matter, a ranking, a categorization, a requirement that the call be directed to (or not directed to) a particular call center 108, an associated skill level it may be desirable for agent 110 answering the call to possess, an estimated time to resolve the call, or the like. Load balancer module 106 may use one or more of these results to route the call.

Routing the call may depend upon one or more of the propensity value, the urgency value, the complexity value, or information regarding the call, customer 102, call centers 108, or agents 110. Thus, load balancer module 106 may comprise one or more processes, methods, or algorithms to route a call based on one or more of these factors.

As those skilled in the art will appreciate, one or more of inbound call manager module 104, load balancer module 106, call center 108, or agent 110 may include or utilize various operating systems (e.g., Windows, OS, UNIX, Linux, Solaris, Android, or iOS), various support software packages, or drivers typically associated with computers. Further, one or more of inbound call manager module 104, load balancer module 106, call center 108, or agent 110 may include or use any suitable telephone, personal computer, network computer, workstation, minicomputer, mainframe, tablet, mobile device, or the like. Customer 102 may comprise any combination of hardware or software that can initiate communication with inbound call manager module 104.

One or more of inbound call manager module 104, load balancer module 106, call center 108, or agent 110 may employ any type of database, such as relational, hierarchical, graphical, object-oriented, or other database configurations. Common database products that may be used include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields, or any other data structure. Association of certain data may be accomplished through any desired data association technique, such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, or the like. The association step may be accomplished by a database merge function, for example, using a "primary key field" (hereinafter "key field"), in pre-selected databases or data sectors.

More particularly, a key field may partition a database associated with one or more of inbound call manager module 104, load balancer module 106, call center 108, or agent 110 according to the high-level class of objects defined by the key field. For example, certain types of data may be designated as a key field in a plurality of related data tables, and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the disclosure, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; or other proprietary techniques, which may include fractal compression methods, image compression methods, or the like.

In one exemplary aspect, the ability to store a wide variety of information in different formats is facilitated by storing the information as a BLOB. Thus, any binary information can be stored in a storage space associated with a data set.

As discussed above, the binary information may be stored on the financial transaction instrument or external to, but affiliated with, the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used). By using BLOB methods, the ability to store various data sets that have different formats facilitates the storage of data associated with the system by multiple and unrelated owners of the data sets. For example, a first data set, which may be stored, may be provided by a first party, a second data set, which may be stored, may be provided by an unrelated second party, and yet a third data set, which may be stored, may be provided by a third party unrelated to the first and second party. Each of these three example data sets may contain different information that is stored using different data storage formats or techniques. Further, each data set may contain subsets of data that also may be distinct from other subsets.

As stated above, in various aspects of one or more of inbound call manager module 104, load balancer module 106, call center 108, or agent 110, the data can be stored without regard to a common format. However, in one exemplary aspect of the disclosure, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, a transaction or membership account identifier, or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on at least the transaction, inbound call manager module 104, load balancer module 106, call center 108, or agent 110, or the like. Furthermore, the security information may restrict/permit only certain actions such as accessing, modifying, or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one aspect, the header or trailer is not stored on the transaction device along with the associated issuer-owned data, but instead the appropriate action may be taken by providing, to the transaction instrument user at the standalone device, the appropriate option for the action to be taken. A data storage arrangement wherein the header or trailer, or header or trailer history, of the data may be stored on the transaction instrument in relation to the appropriate data. One skilled in the art will also appreciate that, for security reasons, any databases, systems, devices, servers, or other components of one or more of inbound call manager module 104, load balancer module 106, call center 108, or agent 110 may comprise any combination thereof at a single location or at multiple locations, wherein each database or system includes any of various suitable security features, such as firewalls, access codes, encryption, decryption, compression, decompression, or the like.

In embodiments, information developed from call manager module 104, load balancer module 106, or any one of call center 108 or agent 110 can be logged in a traffic log. The call traffic log can be centrally managed by, e.g., call manager module 104 or load balancer module 106, or provided from eventual call recipients/respondents such as call centers 108 or agents 110, to call manager module 104, load balancer module 106, or other entities. The call traffic logs can be analyzed for refinement of load balancing.

In an embodiment, a call traffic log can be provided to a call simulator. The call simulator can determine minimum, average, and peak traffic at different times and of different types to simulate calls for testing of various load balancing algorithms or training of personnel. In embodiments, the logs can be used to establish baseline or benchmark call traffic volumes and characteristics. A simulator utilizing the logs can be programmed to exceed these baselines or benchmarks, or otherwise suddenly or incrementally increase traffic to stress test load balancing algorithms and call capacity. In an embodiment, the amounts created can determine the maximum incidental and sustained rates for load balancing and downstream capabilities after simulated calls are routed.

In embodiments, the functionality FIG. 1 can be further described with respect to specific modules of call manager module 104 and/or load balancer module 106.

Call manager module 104 can include or interact with various modules or subcomponents. As illustrated, inbound call manager module 104 includes customer information module 142, urgency module 144, and complexity module 146. Customer information module 142 receives caller account information and generates an account value based on the caller account information. Customer information module 142 can further include or be related to an upsell propensity module that generates an upsell propensity value based on the caller account information, the call score further based on the upsell propensity value. Urgency module 144 develops caller attitude information and generates an urgency value based on the caller attitude information. Complexity module 146 determines call issue information and generates a complexity value based on the call issue information.

Load balancer module 106 can also include or interact with various modules or subcomponents. As illustrated, load balancer module 106 includes call score module 162, routing module 164, matching module 166, delay module 168, selection module 170, and logging module 172. Call score module 162 receives the account value, the urgency value, and the complexity value and generates a call score based on the account value, the urgency value, and the complexity value. Routing module 164 module routes the incoming call to a selected call response entity based on the call score. Matching module 166 matches one or more response entities (e.g., call centers, agents) to the call score. Delay module 168 estimates a minimum expected delay for the one or more response entities. Selection module selects a selected response entity based on the call score and the minimum expected delay. Logging module 172 logs routing of the incoming call in a call traffic log, which can be provided to, e.g., a call simulator, or used to refine data driving load balancer module 106.

Figure 2:
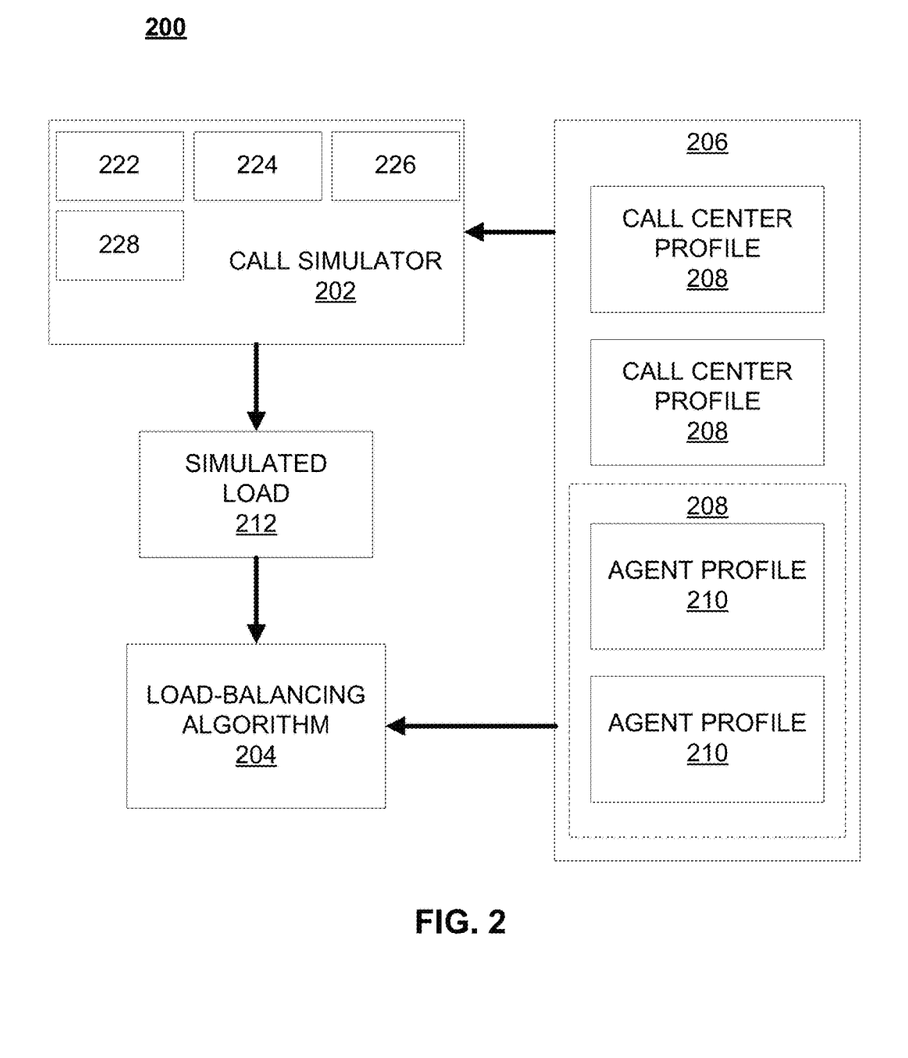
FIG. 2 is a block diagram of a data flow for an exemplary simulator.

In this regard, FIG. 2 is a block diagram of a simulator 200 that may be used to simulate environment 100 as described herein. Simulator 200 may include a call simulator 202 that inputs simulated "calls" that can be used to determine an impact of different load balancing methods on call centers 108. For example, a call simulator 202 may periodically output one or more simulated calls based on historical or estimated call input rates, or various other values such as arbitrary or calculated rates to stress test various load balancing algorithms. The simulated calls may include raw call data, such as user answers to prompts from inbound call manager module 104. In an aspect, simulated calls may be call scores, including, for example, propensity values, call complexity (e.g., low, medium, high), or the like, as discussed above. Call simulator 202 may provide simulated calls to load-balancing algorithm 204.

Simulator 200 may comprise or access profiles 206 regarding one or more call center 108 or agent 110. Profiles 206 may comprise one or more call center profiles 208. In turn, call center profile may optionally comprise one or more agent profiles 206. Call center profiles 208 may be based on demographic data associated with call center 108 or associated agents 110, including head count, skill level, or the like, based on current information. Call center profiles 208 may include predicted performance of associated call centers 108, and agent profiles 210 may include predicted performance of associated agents 110. The predicted performance may include, for example, throughput, time-per-call, success rates, or the like. The predicted performance may further be broken down by call type, call complexity, propensity value, or the like. Predicted performance may be based on actual past performance thereof or based on an analysis of the demographics of call centers 108 or agents 110. For example, if call center profile 208 associated with call center 108 does not have historical performance data of call center 108 (e.g., because call center 108 is new or agents 110 comprising call center 108 are new), call center profile 208 may predict or approximate expected performance associated with call center 108 based on historical trends based on call center profiles 208 or agent profiles 210 that have a number of shared demographics with the particular call center 108.

Load-balancing algorithm 204 may use profiles 206 to route simulated calls from call simulator 202 to particular call centers 108 or agents 110 associated with the respective profiles 206. The output of load-balancing algorithm 204 may be provided to a simulated load 212. Simulated load 212 may simulate activity of call centers 108 or agents 110 based on simulated calls assigned to the respective call centers 108 or agents 110 and based on profiles 206 associated with each of the respective call centers 108 or agents 110. In an aspect simulated load 212 allows for evaluation of the efficacy of load-balancing algorithm 204 without actually having to implement load-balancing algorithm 204 in a life call center environment. This may allow adjusting or fine-tuning of load-balancing algorithm 204.

Load-balancing algorithm 204 may use simulated load 212 when routing simulated calls. For example, load-balancing algorithm 204 may route simulated calls based at least in part on queue lengths associated with one or more call centers 108 or agents 110. In this manner, a feedback loop between load-balancing algorithm 204 and simulated load 212 may be used to evaluate or adjust load-balancing algorithm 204.

In embodiments, the functionality of FIG. 2 can be further described with respect to specific modules of call simulator 202, which can include or interact with various modules or subcomponents. Call simulator 202 can include call simulator analysis module 222, call simulator generation module 224, call simulator routing module 226, and profile generation module 228. Call simulator analysis module 222 receives one or more response entity profiles, where such response entity profiles are based on performance metrics associated with one or more response entities to which the load balancing algorithm routes inbound calls. Call simulator generation module 224 generates a simulated load of simulated calls having varying call characteristics. The varying call characteristics are based on the response entity profiles. Call simulator routing module 226 transmits the simulated load to various entities receiving simulated calls, such as a computer system running a load balancing algorithm, or an actual number or call center itself (or groups/combinations thereof). Profile generation module generates the response entity profiles based on a call traffic log associated with the load balancing algorithm.

While the aspects illustrated in FIGS. 1 and 2 can include the illustrated modules, subcomponents, et cetera, every embodiment need not include all elements illustrated, and other elements may be included without departing from the scope or spirit of the innovation. Further, while the particular arrangement is provided for ease of explanation and illustrative purposes, alternative embodiments providing different implementations are embraced within this disclosure, which can include, e.g., including with load balancer module 106 modules shown associated with inbound call manager module 104 or vice versa, or modifying the relationship between modules shown in relation to call simulator 202.

Figure 3:
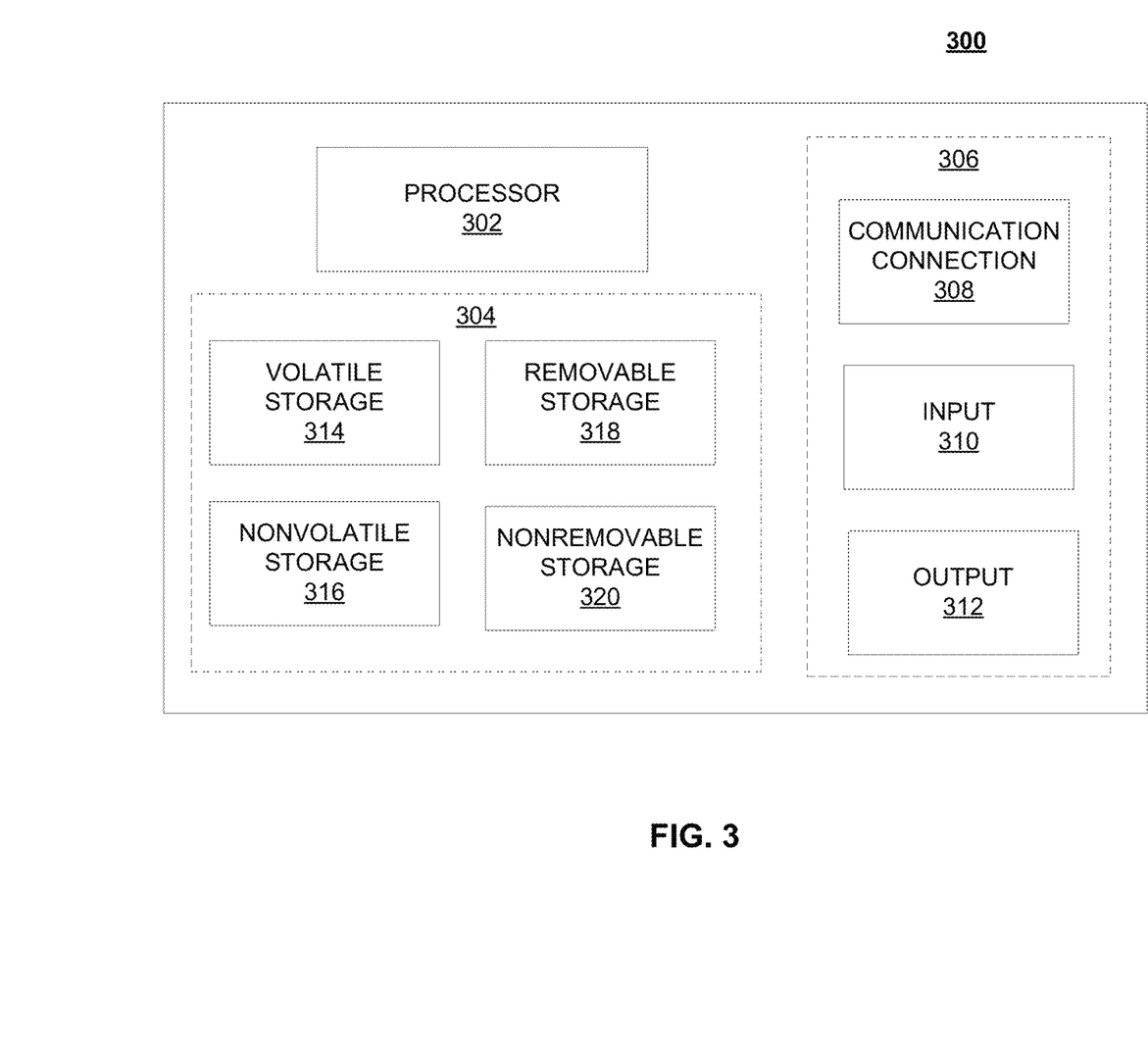
FIG. 3 is a block diagram illustrating an exemplary implementation of a simulator device.

Turning to environments for implementing aspects herein, device 300 may comprise all or a part of simulator 200. Device 300 may comprise hardware or a combination of hardware and software. The functionality to facilitate telecommunications via a telecommunications network may reside in one or combination of network devices. Device 300 depicted in FIG. 2 may represent or perform functionality of an appropriate device 300, or combination of network devices, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 2 is exemplary and not intended to imply a limitation to a specific implementation or configuration. Thus, device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, device 300 is not to be construed as software per se.

In addition to processor 302 and memory 304, device 300 may include an input/output system 306. Processor 302, memory 304, and input/output system 306 may be coupled together (coupling not shown in FIG. 2) to allow communications therebetween. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or providing information from or to a communications device or other network entities configured for telecommunications. For example input/output system 306 may include a wireless communications (e.g., WiFi/ 2.5G/3G/4G/GPS) card. Input/output system 306 may be capable of receiving or sending video information, audio information, control information, image information, data, or any combination thereof. Input/output system 306 may be capable of transferring information with device 300. In various configurations, input/output system 306 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 306 may comprise a WiFi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of device 300, determining a type of broadcast message and acting according to the broadcast message type or content, as described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations to map signal strengths in an area of interest.

Figure 4:
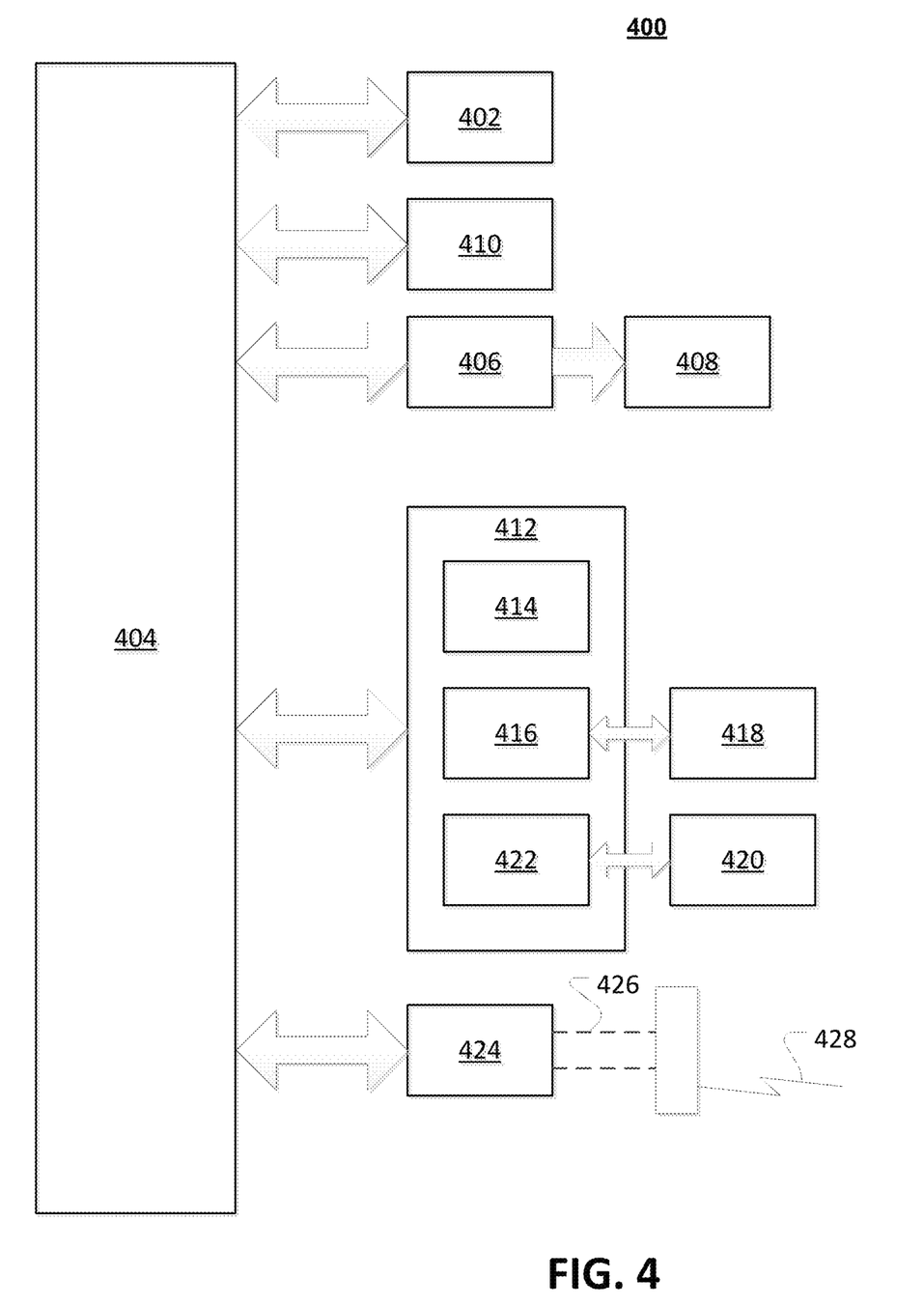
FIG. 4 is a block diagram of a computer system that may comprise all or a portion of an exemplary simulator.

FIG. 3 illustrates a computer-based system 400 that may constitute or include parts of one or more of inbound call manager module 104, load balancer module 106, call center 108, agent 110, or device 300. Computer-based system 400 includes at least one processor, such as a processor 402. Processor 402 may be connected to a communication infrastructure 404, for example, a communications bus, a crossover bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer (not shown) for display on a display unit 408.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, etc. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 416, a hard disk installed in hard disk drive 414, or the like. These computer program products provide software to computer-based system 400. The present disclosure is directed to such computer program products.

Computer programs (also referred to as computer control logic) may be stored in main memory 410 or secondary memory 412. The computer programs may also be received via communication infrastructure 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using software. The software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Figure 5:
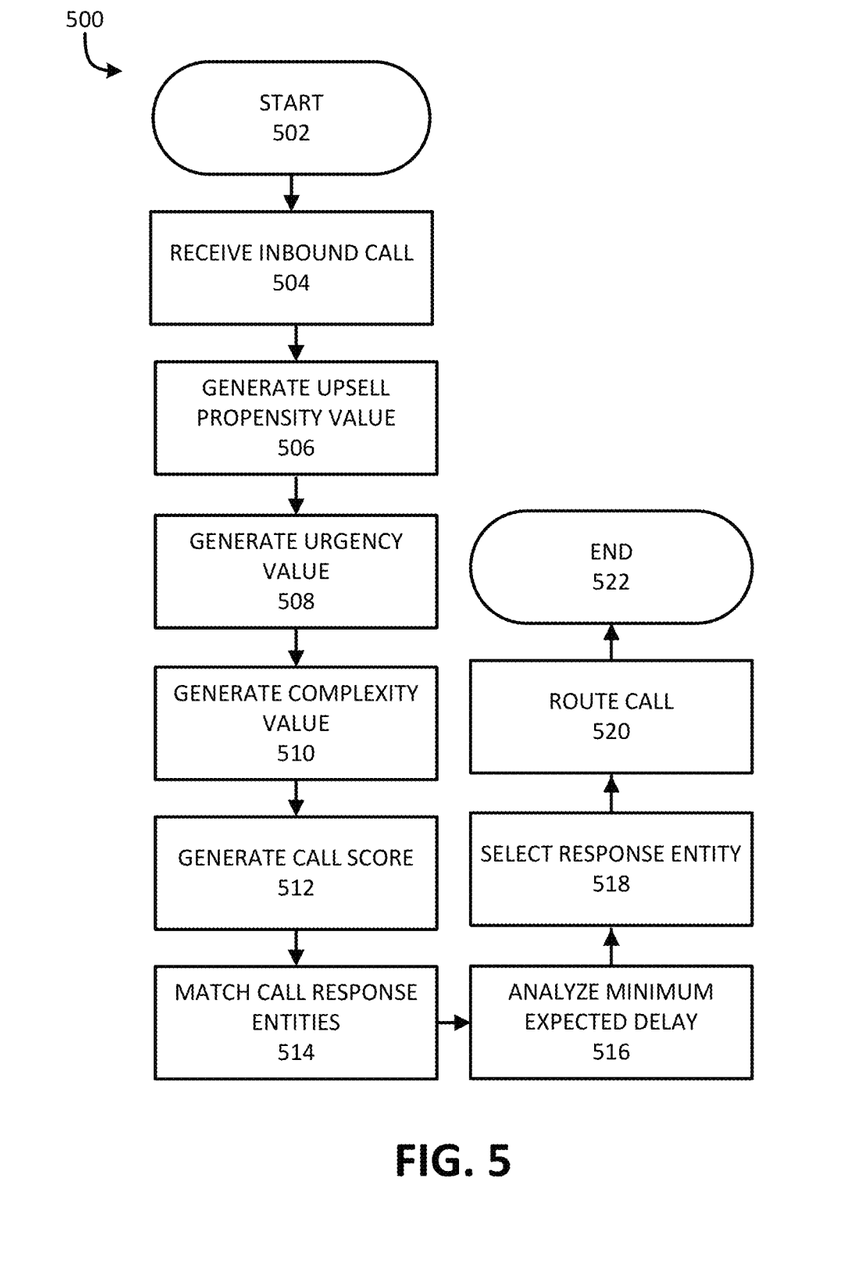
FIG. 5 is a block diagram of an example methodology disclosed herein.

Turning to FIG. 5, illustrated is a methodology 500 for balancing a call load. Methodology 500 begins at 502 and proceeds to 504 where an inbound call is received. At 506, an upsell propensity value is generated based on caller account information and group history for correlated customer groups with which the caller is associated. At 508, an urgency value is generated based on caller attitude information. At 510, a complexity value is generated based on call issue information.

With this information, at 512, a call score is generated based on the upsell propensity, urgency value, and complexity value. With this call score, at 514, one or more response entities (e.g., call centers, agents) can be matched to the call score. The matched response entities are analyzed to determine a minimum expected delay at 516.

Following this analysis, at 518, a selected response entity is selected based on the call score and minimum expected delay. The call is routed to the selected response entity at 520, and methodology 500 then ends at 522.

Various other aspects can be implemented in embodiments of methodology 500. In an embodiment, the response entity is further selected based on a caller identity of the caller. In an embodiment, the identity of a caller or issue related to call may proscribe selection of a particular response entity, which can be eliminated from consideration.

In an embodiment, the caller account includes a caller transactional history. In embodiments, the caller account includes information on parties sharing the account and related accounts, and/or event information relating to occurrence or non-occurrence of a life event.

In various embodiments, the caller attitude information is based on caller voice analysis. The voice analysis includes data on caller tone of voice, words per minute, changed answers to the same question, returning to an earlier step in a process, requesting repetition of information, or multiple attempts to select an option.

In one or more embodiments, the call issue information includes a number of issues to be addressed, a category of services, a type of change to the caller account, and an estimated time to complete all issues.

Methodology 500 can include additional steps such as determining a call center score for matching with the call score. The call center score can be based on call answer statistics, call statistics, call center routing protocols, a forecast call center volume, call center delays, a call center queue, a call center queue threshold, a call center daily volume, an average agent skill level, and an agent headcount.

Methodology 500 can further include aspects concerning logging routing of the call to the selected call center in a call traffic log. The traffic call log can be provided to a call simulator.

Methodology 500 can further include, in embodiments, receiving performance data from the selected call center, entering the performance data in the call traffic log, and recalculating the minimum expected delay (or various other call center metrics) based on the call traffic log.

Figure 6:
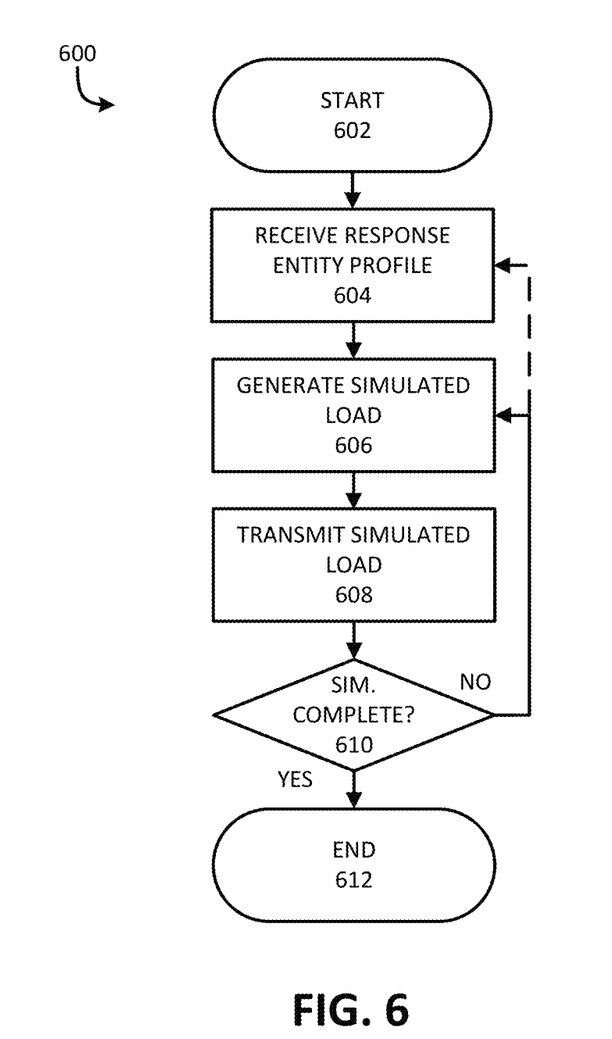
FIG. 6 is a block diagram of another example methodology disclosed herein.

FIG. 6 illustrates a methodology 600 for conducting call simulations. Methodology 600 begins at 602 and proceeds to 604 where an entity response profile is received. The entity response profile can include various details or metrics relating to an entity which responds to calls. At 606, a simulated load of simulated calls is generated. The simulated calls can have varying call characteristics. The varying call characteristics can be based on the response entity profiles. At 608, the simulated load can be transmitted to a recipient for handling the calls, such as a phone number, computer system including a load managing system, et cetera. At 610, a determination is made as to whether the simulation is complete. If not, methodology 600 can recycle to 606 for generation of additional load for transmission, or can return to 604 to receive response entity profiles (which may be updated based on the already-transmitted load). If the simulation is determined to be complete at 610, methodology 600 can advance to end at 612.

Various other aspects can be utilized with methodology 600. For example, an additional step can include generating the response entity profiles based on a call traffic log associated with the load balancing algorithm.

The elements of FIGS. 5 and 6 can be implemented as methods, or as modules or executable instructions stored on non-transitory computer readable media.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network-based portal.

While aspects of the present disclosure have been particularly shown and described with reference to the examples above, it will be understood by those skilled in the art(s) that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof

What is claimed is:

1. A method, comprising:

receiving, at an inbound call manager, a call from a caller for routing to one of two or more call centers, wherein the inbound call manager is associated with the two or more call centers, and wherein the call includes interactive voice response (IVR) information including voice audio of the caller;

determining caller attitude information, based on caller voice analysis of the voice audio, wherein the voice analysis includes two or more of data on caller tone of voice, words per minute, changed answers to the same question, returning to an earlier step in a process, requesting repetition of information, or multiple attempts to select an option;

generating an urgency value based on the caller attitude information;

generating a complexity value based on call issue information, wherein the call issue information includes a number of issues to be addressed, a category of services, and an estimated time to complete all issues;

generating, using a load balancer, a call score based on the urgency value and the complexity value, wherein the load balancer is associated with the two or more call centers;

matching, using the load balancer, at least one of the two or more call centers to the call score;

analyzing, using the load balancer, the two or more call centers to determine a minimum expected delay;

selecting, using the load balancer, one of the two or more call centers as a selected call center based on matching of the call score and the minimum expected delay, wherein the load balancer selects the selected call center by applying a rule to the call scores and the minimum expected delay, and wherein the rule is a dynamic rule that changes when call traffic to one or more of the two or more call centers exceeds a threshold;

routing the call, using a routing module of the load balancer configured to utilize two or more proprietary routing protocols, to the selected call center; and logging, using the load balancer, routing of the call to the selected call center in a call traffic log.

2. The method of claim 1, further comprising:

retrieving caller account information, wherein the caller account information includes a caller transactional history and information on parties sharing the account and related accounts.

3. The method of claim 1, further comprising:

retrieving caller account information, wherein the caller account information includes event information relating to occurrence or non-occurrence of a life event.

4. The method of claim 1, further comprising:

determining a call center score for matching with the call score, wherein the call center score is based on call answer statistics, call statistics, call center routing protocols, call center delays, a call center queue, a call center queue threshold, a call center daily volume, an average agent skill level, and an agent headcount.

5. The method of claim 1, further comprising:

providing the call traffic log to a call simulator.

6. The method of claim 1, further comprising:

receiving performance data from the selected call center;

entering the performance data in the call traffic log; and recalculating the minimum expected delay based on the call traffic log.

7. A system, comprising:

a processor operatively coupled with a non-transitory computer readable media, the non-transitory computer readable media storing instructions that when executed by the processor implement:

an inbound call manager module associated with two or more call centers that receives an incoming call, wherein the incoming call includes interactive voice response (IVR) information including voice audio of a caller;

a customer information module of the inbound call manager module that receives caller account information and generates an account value based on the caller account information;

an urgency module of the inbound call manager module that develops caller attitude information and generates an urgency value based on the caller attitude information, wherein the caller attitude information is based on caller voice analysis of the voice audio, wherein the voice analysis includes two or more of data on caller tone of voice, words per minute, changed answers to the same question, returning to an earlier step in a process, requesting repetition of information, or multiple attempts to select an option;

a complexity module of the inbound call manager module that determines call issue information and generates a complexity value based on the call issue information, wherein the call issue information includes a number of issues to be addressed, a category of services, a type of change to the caller account, and an estimated time to complete all issues;

a load balancer module associated with the two or more call centers that receives information from the inbound call manager module;

a call score module of the load balancer module that receives the account value, the urgency value, and the complexity value and generates a call score based on the account value, the urgency value, and the complexity value;

a routing module of the load balancer module that routes the incoming call to a selected call response entity based on the call score, wherein the load balancer selects the selected response entity by applying a rule to the call scores and a minimum expected delay, and wherein the rule is a dynamic rule that changes when call traffic to one or more of the two or more call centers exceeds a threshold, and wherein the routing module is configured to route calls according to two or more proprietary load balancing protocols; and a logging module of the load balancer module that logs routing of the incoming call in a call traffic log.

8. The system of claim 7, the non-transitory computer readable media further storing instructions that when executed by the processor implement:

a call center matching module of the load balancer module that matches at least one of the two or more call centers to the call score;

a call center delay module of the load balancer module that estimates the minimum expected delay for the two or more call centers; and a call center selection module of the load balancer module that selects one of the two or more call centers as a selected call center based on matching of the call score and the minimum expected delay, wherein the selected call center includes the selected call response entity.

9. The system of claim 7, the non-transitory computer readable media further storing instructions that when executed by the processor implement:

an agent matching module of the load balancer module that matches one or more agents to the call score;

an agent delay module of the load balancer module that estimates a minimum expected delay for the one or more agents; and an agent selection module of the load balancer module that selects an agent from the one or more agents as a selected agent based on matching of the call score and the minimum expected delay, wherein the selected agent is the selected call response entity.

10. The system of claim 7, wherein the logging module provides the call traffic log to a call simulator.

11. A system, comprising:

a processor operatively coupled with a non-transitory computer readable media, the non-transitory computer readable media storing instructions that when executed by the processor implement:

a call simulator module operatively coupled with a computer system running a load balancing algorithm;

a call simulator analysis module configured to receive one or more response entity profiles, the response entity profiles based on performance metrics associated with one or more response entities to which the load balancing algorithm routes inbound calls;

a call simulator generation module configured to generate a simulated load of simulated calls having varying call characteristics, wherein the varying call characteristics are based on the response entity profiles, and wherein the varying call characteristics are representative of information collected by interactive voice response (IVR) modules; and a call simulator routing module configured to transmit the simulated load to the computer system, wherein the load balancing algorithm is configured to generate call scores for calls among the simulated load based on an urgency and a complexity of the calls, wherein the urgency of the calls is based on a respective caller attitude, wherein the caller attitude is determined based on voice analysis, wherein the voice analysis includes two or more of data on caller tone of voice, words per minute, changed answers to the same question, returning to an earlier step in a process, requesting repetition of information, or multiple attempts to select an option, and wherein the complexity of the calls is based on respective call issue information including a number of issues to be addressed, a category of services, a type of change to the caller account, and an estimated time to complete all issues, wherein the load balancing algorithm is configured to route the calls to one or more simulated call centers based on a minimum expected delays associated with each of the one or more simulated call center and applying a dynamic rule to the call scores, wherein the dynamic rule is configured to change based on call traffic to the one or more simulated call centers exceeding a threshold, and wherein the load balancing algorithm is configured to route calls to simulated call centers according to two or more proprietary routing protocols.

12. The system of claim 11, wherein the non-transitory computer readable media further stores instructions that when executed by the processor implement:
   a profile generation module of the call simulator module that generates the one or more response entity profiles based on a call traffic log associated with the load balancing algorithm.

13. The method of claim 1, wherein the complexity value is based on the category of services and a number of sub-steps required to complete a request associated with the call.

14. The system of claim 11, wherein the complexity is based on a category of services and a number of sub-steps required to complete a request associated with the call.

15. The method of claim 1, wherein the urgency value is based on the speed of a response of the caller.

16. The method of claim 1, wherein the urgency value is based on a changed response from the caller.

17. The method of claim 1, further comprising:
   determining a call center score for matching with the call score, wherein the call center score is based on a forecast call center volume.

18. The method of claim 17, wherein the forecasted call center volume describes a forecasted call volume by call type.

* * * * *